(12) United States Patent
Kokubo

(10) Patent No.: US 7,266,694 B2
(45) Date of Patent: Sep. 4, 2007

(54) NETWORK RELAY DEVICE, COMMUNICATION DEVICE AND NETWORK RELAY METHOD

(75) Inventor: Takashi Kokubo, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 735 days.

(21) Appl. No.: 10/673,245

(22) Filed: Sep. 30, 2003

(65) Prior Publication Data
US 2004/0107343 A1 Jun. 3, 2004

(30) Foreign Application Priority Data
Sep. 30, 2002 (JP) ............................. 2002-287116

(51) Int. Cl.
G06F 9/00 (2006.01)

(52) U.S. Cl. ..................... 713/171; 713/168; 713/161

(58) Field of Classification Search ................ 713/171, 713/168, 161
See application file for complete search history.

(56) References Cited

OTHER PUBLICATIONS

U.S. Appl. No. 10/627,650, Tomoe Kawakami et al., "Relay Apparatus and Network Relay Method", Jul. 28, 2003.
Institute Of Electrical And Electronics Engineers, Inc., P1394.1, "Draft Standard For High Performance Serial Bus Bridges", Mar. 29, 2001, pp. 12, 13, 83, 84.

*Primary Examiner*—Thomas R. Peeso
(74) *Attorney, Agent, or Firm*—Finnegan, Henderson, Farabow, Garrett & Dunner, L.L.P.

(57) ABSTRACT

In accordance with the present invention, a network relay device includes a first interface which is connected to a first network and sends contents information encrypted by key information, a second interface which is connected to a second network and sends the contents information to a receiving a network relay device, and a notification section which detects that the key information is changed and notifies a key change notification signal to the receiving network relay device.

4 Claims, 6 Drawing Sheets

NETWORK RELAY DEVICE, COMMUNICATION DEVICE AND NETWORK RELAY METHOD

CROSS-REFERENCE TO RELATED APPLICATIONS

This application is based upon and claims the benefit of priority from the prior Japanese Patent Application No. 2002-287116, filed Sep. 30, 2002, the entire contents of which are incorporated herein by reference.

BACKGROUND OF THE INVENTION

1. Field of the Invention

The present invention relates to a network relay device, and in particular to, a network relay device handling contents information encrypted by DTCP (Digital Transmission Content Protection) standard, a communication device and a network relay method.

2. Description of the Related Art

Recently, in accordance with development and wide application of digital equipment, demands for such network communication devices have been growing. In such network communication devices, high-speed and multi-functional data transmission is performed by using digital transmission.

For example, in accordance with digital transmission, data (contents) flowing on the transmission is easily tampered and copied and thus techniques for protecting the contents are required. One of the techniques standardized for such protection is DTCP standard (see http://www.dtcp.com). The technique is developed in order to protect digital synchronous packet data flowing on an IEEE1394 high-speed serial bus against tampering and illegal copying. The specification is disclosed on the aforementioned URL, and is used for passing data with digital televisions or digital VHSs.

The DTCP standard is to be extended to a standard for, as well as the IEEE1394 high-speed serial bus, the case of transmitting on other bus standards such as USB (Universal Serial Bus) or the case of transmitting over different networks.

In accordance with prior arts using the DTCP standard, a network communication device and a network relay device perform encryption and decryption processings based on the DTCP standard and network communication while a security against the third party being maintained. In accordance such prior arts, however, a processing for researching key information used for encryption is not performed.

In accordance with the DTCP standard, when a sending communication device stops sending of contents and then resumes, the sending communication device may encrypt the contents with a cryptographic key which is different from the cryptographic key used before resumption and send the encrypted contents. A receiving communication device can detect that transmission of the contents is stopped but cannot strictly and correctly make a determination. For this reason, the receiving communication device must confirm, every time when the sending is stopped, a key number (key number which is changed every time when the contents is sent) by using an AKE command.

Accordingly, when sending of the contents encrypted based on the DTCP standard from the sending communication device is stopped, the network relay device also stops the contents to be sent to the receiving communication device. The receiving communication device confirms a key number by using an AKE command even when, as well as the key number is changed, sending is delayed simply because of noises. Thus, there arises a problem about a delayed sending/receiving speed.

In accordance with conventional network relay devices, when communication for encrypted contents based on the DTCP standard is performed, if the contents from a sending device is delayed, a key may be changed. For this reason, a network relay device temporarily stops sending of the contents to a receiving network relay device and must inspire a receiving communication device to confirm a key number by an AKE command. Nevertheless, the key number is not necessarily changed and the contents information may be delayed simply because of noises. As a result, the receiving communication device repeats waste key number confirmation, resulting in a delayed communication.

BRIEF SUMMARY OF THE INVENTION

In accordance with one embodiment of a network relay device according to the present invention, there is provided a network relay device that performs communication in order to relay from a first network to a second network comprises a first interface which is connected to the first network and receives contents information encrypted by key information; a second interface which is connected to a second network which is different from the first network and sends the contents information; and a notification section which detects whether or not the key information is changed via the first interface, and which, if the key information is changed, notifies a key change notification signal to the second network via the second interface.

DETAILED DESCRIPTION OF THE INVENTION

An example of a network relay device and a communication device (digital equipment with a communication function) on a network relating to embodiments of the present invention will be described in detail hereinafter with reference to the drawings.

<Structures of Network Relay Device and Communication Device>

Figure 1:
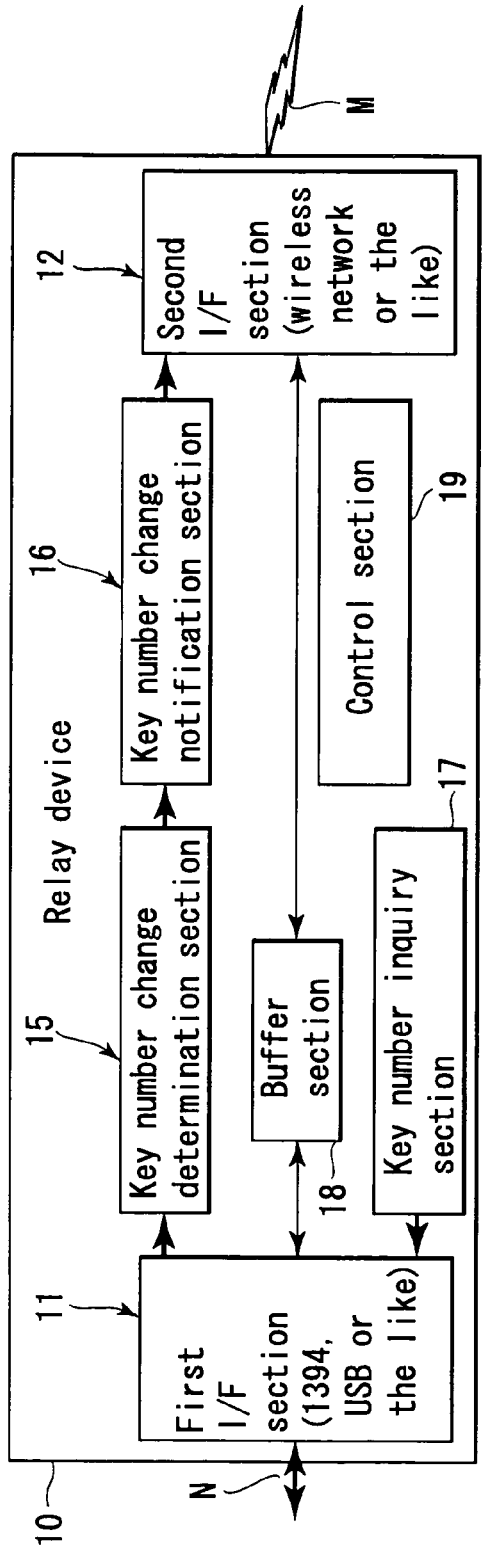
FIG. 1 is a block diagram illustrating an example of the structure of a network relay device according to the present invention.
Figure 2:
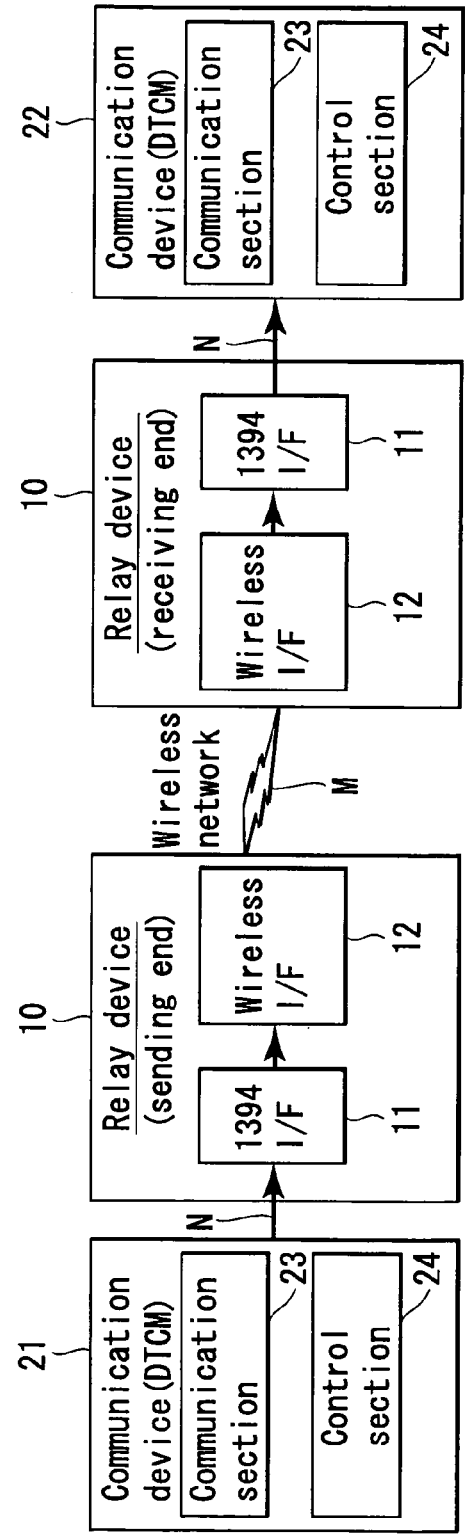
FIG. 2 is a system diagram illustrating a network system using the network relay device according to the present invention.

Structures of the network relay device and the communication device on a network according to the present invention will be firstly described with reference to the drawings. FIG. 1 is a block diagram illustrating an example of the structure of the network relay device according to the present invention. FIG. 2 is a system diagram illustrating a network system using the network relay device according to the present invention.

As shown in FIG. 2, at least two or more network relay devices 10 according to the present invention, as a pair, perform, e.g., wireless communication and configure a wireless network in order to relay a plurality of first networks N, N by, e.g., a USB (Universal Serial Bus) or an IEEE (Institute of Electrical and Electronics Engineers) 1394. An example of such network relay device 10 includes, as shown in FIG. 1, a first interface 11 connected to the first network N and a second interface 12 connected to a second network M. Further, the network relay device 10 with a function of connecting the first network N to the second network M includes a key number inquiry section 17 for inquiring of a contents-sending communication device 21 a cryptographic key number of contents received via the first interface 11, a key number change determination section 15 for determining whether or not the key number obtained from the key number inquiry section 17 is changed, and a key number change notification section 16 for, if it is determined by the key number change determination section 15 that the key number is changed, notifying that the key number has been changed to a receiving communication device connected via the second interface. Moreover, a buffer 18 for temporarily storing contents information sent/received via the first interface section 11 and the second interface section 12 and a control section 19 for controlling the overall operation are comprised.

Such network relay device 10 according to the present invention receives, as shown in FIG. 2, contents-information from the sending communication device 21 provided on, e.g., an IEEE1394 network. The contents information is encrypted by, e.g., DTCP (Digital Transmission Content Protection). The contents-sending communication device 21 shares a secret cryptographic key Kx1 with the contents receiving communication device 22. The receiving communication device 22 decrypts the encrypted and then transmitted contents information by the shared cryptographic key Kx1 and then receives the decrypted contents information.

The sending communication device 21 and the receiving communication device 22 may be, e.g., digital equipment such as DTV (Digital Television) or DVR (Digital Video Recorder) with a communication function, or may be PC (Personal Computer) with a communication function. When such communication device performs a sending processing, the device is called a sending communication device, and when the communication device performs a receiving processing, this device is called a receiving communication device. Such devices refer to as a communication device serving as digital equipment with a communication function.

These communication devices 21, 22 comprise a communication section 23 which includes an interface and buffer for communication based on a communication standard (e.g., IEEE1394) for a network N and a control section 24 for controlling the communication operation of the communication section. Such communication devices perform a communication processing with respect to contents information and commands with similar communication devices with communication function on other networks in accordance with the communication standard for the network N. Further, the communication devices perform a communication processing with the network relay device 10 according to the present invention on a basis of the communication standard.

The sending network relay device 10 transmits encrypted contents information based on a DTCP standard to the receiving network relay device 10 on a wireless network without decrypting the contents information. The receiving network relay device 10 which receives the encrypted contents transmits the contents to, e.g., an IEEE1394 network N without decrypting the contents. When the receiving communication device 22 provided on the IEEE1394 network N receives the contents information, the device decrypts the contents information by using a cryptographic key obtained by performing in advance an authentication with the contents-sending communication device, and outputs the decrypted contents information.

<Decrease in Communication Speed>

Figure 3:
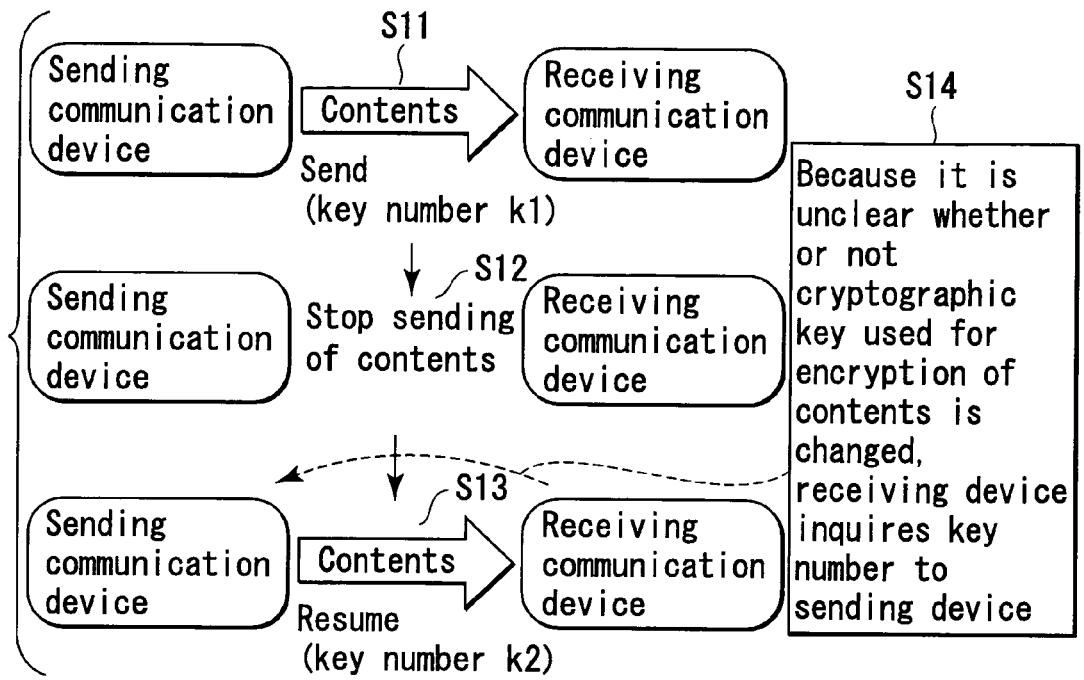
FIG. 3 is a flowchart for explaining a communication operation in the case in which when the network relay device according to the present invention does not perform key number change notification, a sending communication device stops sending of contents and then resumes.
Figure 4:
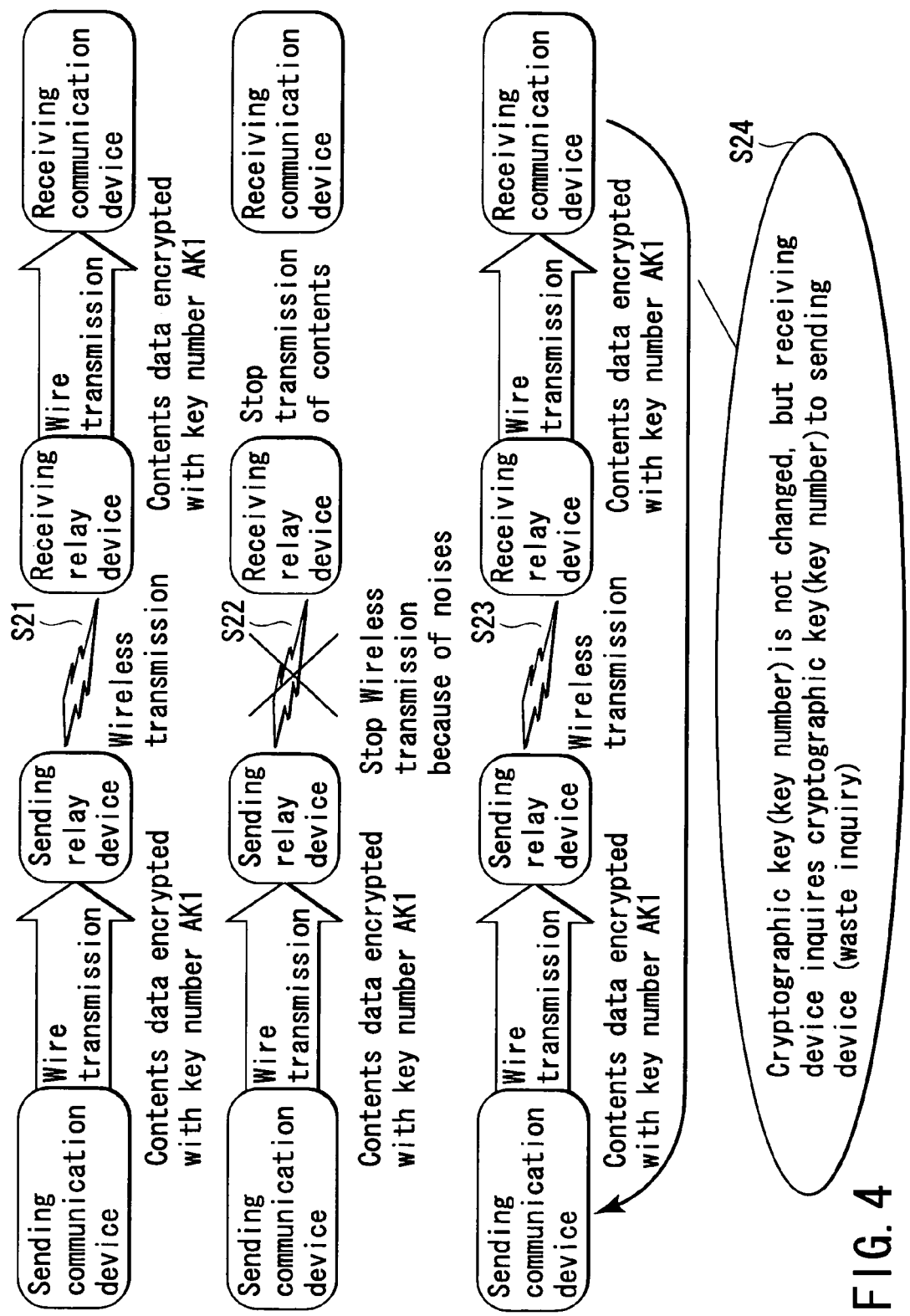
FIG. 4 is a flowchart for explaining a communication operation in the case in which when the network relay device according to the present invention does not perform the key number change notification, the sending communication device stops sending of the contents and then resumes.
Figure 5:
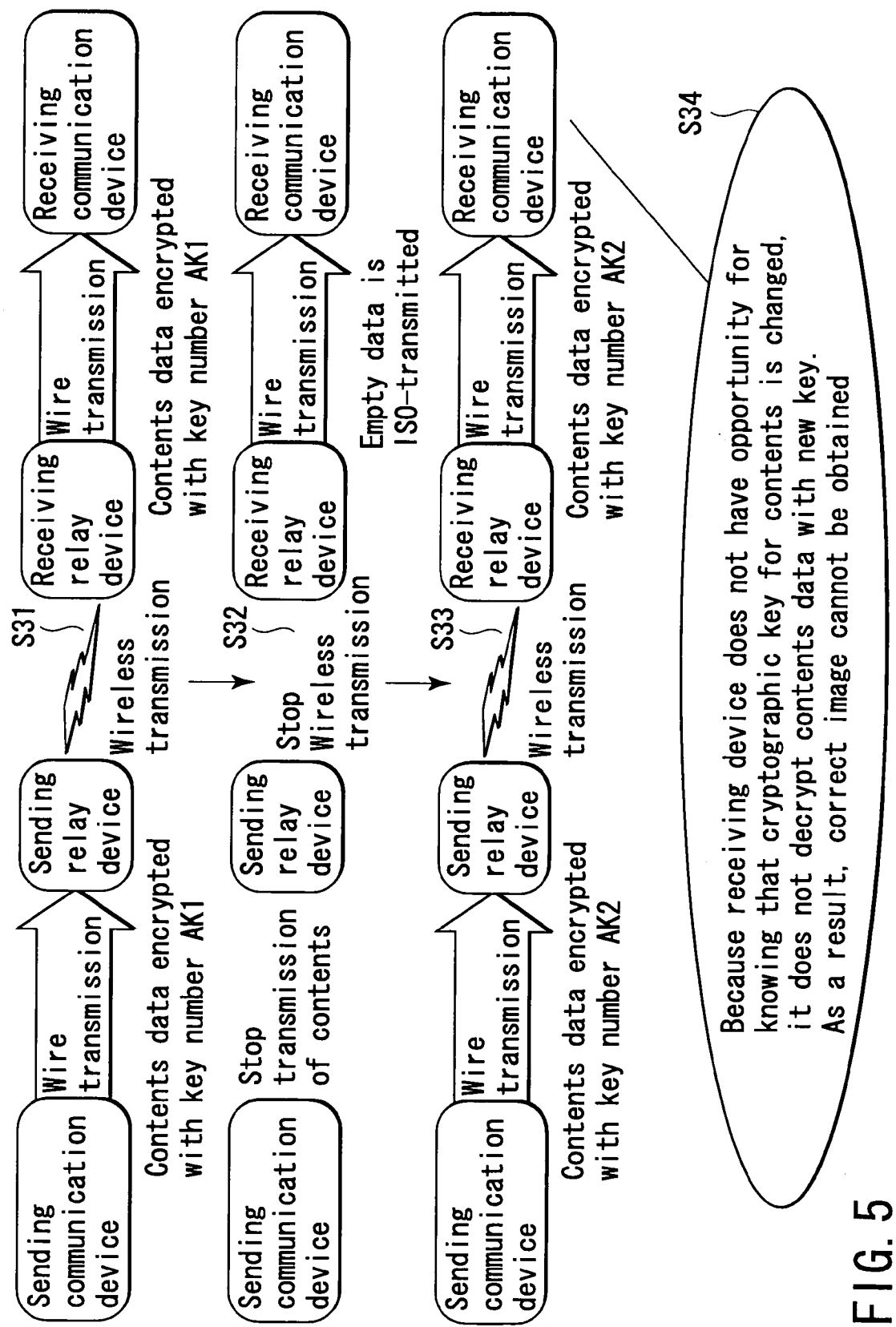
FIG. 5 is a flowchart for explaining a communication operation in the case in which when the network relay device according to the present invention does not perform the key number change notification, the sending communication device stops sending of the contents and then resumes.

In accordance with the network relay device 10 according to the present invention structuring such network, a communication speed is decreased because of noises as follows. FIGS. 3 through 5 are flowcharts for explaining a communication operation in the case in which when the network relay device of the present invention does not notify that a key number is changed, the sending communication device stops sending of contents and then resumes sending.

Referring to FIG. 3, the sending communication device performs communication about contents information with the receiving communication device based on the DTCP standard (S11). The sending communication device stops sending of the contents because of noises or of actually changing a key (S12). Then, the communication is resumed (S13). At this time, the sending communication device may encrypt the contents with a cryptographic key which is different from the cryptographic key used before resumption and send the contents. The receiving communication device can detect that transmission of the contents is stopped but cannot determine strictly and correctly whether or not the cryptographic key used before sending is stopped is the same as the cryptographic key used after resumption. For this reason, every time when sending is stopped, the receiving communication device must confirm a key number which is changed every time the contents is sent by sending an AKE command to the sending communication device (S14). Thus, every time communication is stopped and then resumed, a key number confirmation processing is performed, resulting in a delay of the communication.

As shown in FIG. 4, a communication processing including a DTCP processing for the contents information is performed between the communication devices 21, 22 provided on different networks by using two or more network relay devices 10 according to the present invention (S21). When sending of the contents information from the sending communication device 21 to the sending relay device 10 is suspended because of noises, sending of the contents information from the sending relay device 10 to the receiving relay device 10 is also suspended. Further, sending from the receiving relay device 10 to the receiving communication device 22 is suspended (S22).

Thereafter, sending of the contents information from the sending communication device 21 to the sending relay device 10 resumes, sending from the sending relay device 10 to the receiving relay device 10 resumes and sending from the receiving relay device 10 to the receiving communication device 22 also resumes (S23). It should be noted that although the communication is suspended because of noises, the receiving communication device 22 confirms a key number by sending an AKE command to the sending communication device because the communication may be suspended because the key is changed (S24). This causes a decrease in a communication speed.

In order to prevent such waste key authentication processing, as shown in FIG. 5, by the receiving relay device 10 sending empty data (empty packet) to the receiving communication device 22, the key authentication processing in the receiving communication device 22 can be prevented. Thus, even if sending of contents information is suspended, a key authentication does not occur.

As shown in FIG. 5, when the receiving communication device 22 does not have the function of determining whether or not suspension of the contents information is caused by noises or an actual change of a key number, the receiving communication device 22 cannot obtain the opportunity of changing to the correct cryptographic key. During usual wireless transmission (S31), if sending of the contents information is suspended because of changing a key number (S32), sending from the sending relay device 10 to the receiving relay device 10 is suspended. If the receiving relay device 10 sends empty data to the receiving communication device 22 in any cases (S33), the key authentication processing is not performed. Accordingly, even if noises are not generated but the key is actually changed, the empty data is sent to the receiving communication device 22. For this reason, the receiving communication device 22 cannot know that the cryptographic key for the contents has been changed. Thus, the receiving communication device 22 cannot obtain the correct cryptographic key and fails in decryption of the contents information. For example, the receiving communication device 22 cannot obtain correct image information (S34).

<First Key Change Notification Method>

In accordance with the network relay device 10 according to the present invention, by the key number inquiry section 17, the key number change determination section 15 and the key number change notification section 16 shown in FIG. 1, when it is detected that a key number is changed, the sending relay device 10 sends a key change notification signal to the receiving relay device 10. When sending of the contents information is suspended and the receiving network relay device 10 does not receive the key change notification signal, the receiving network relay device sends empty data to the receiving communication device 22 in order to prevent a waste key authentication processing. Thus, a decrease in a communication speed is prevented. If sending of the contents information is suspended and the key change notification signal is provided, the network relay device does not send the empty data and suspends sending of the contents information in order to inspire the receiving communication device 22 to perform the key authentication processing for obtaining new key information.

Figure 6:
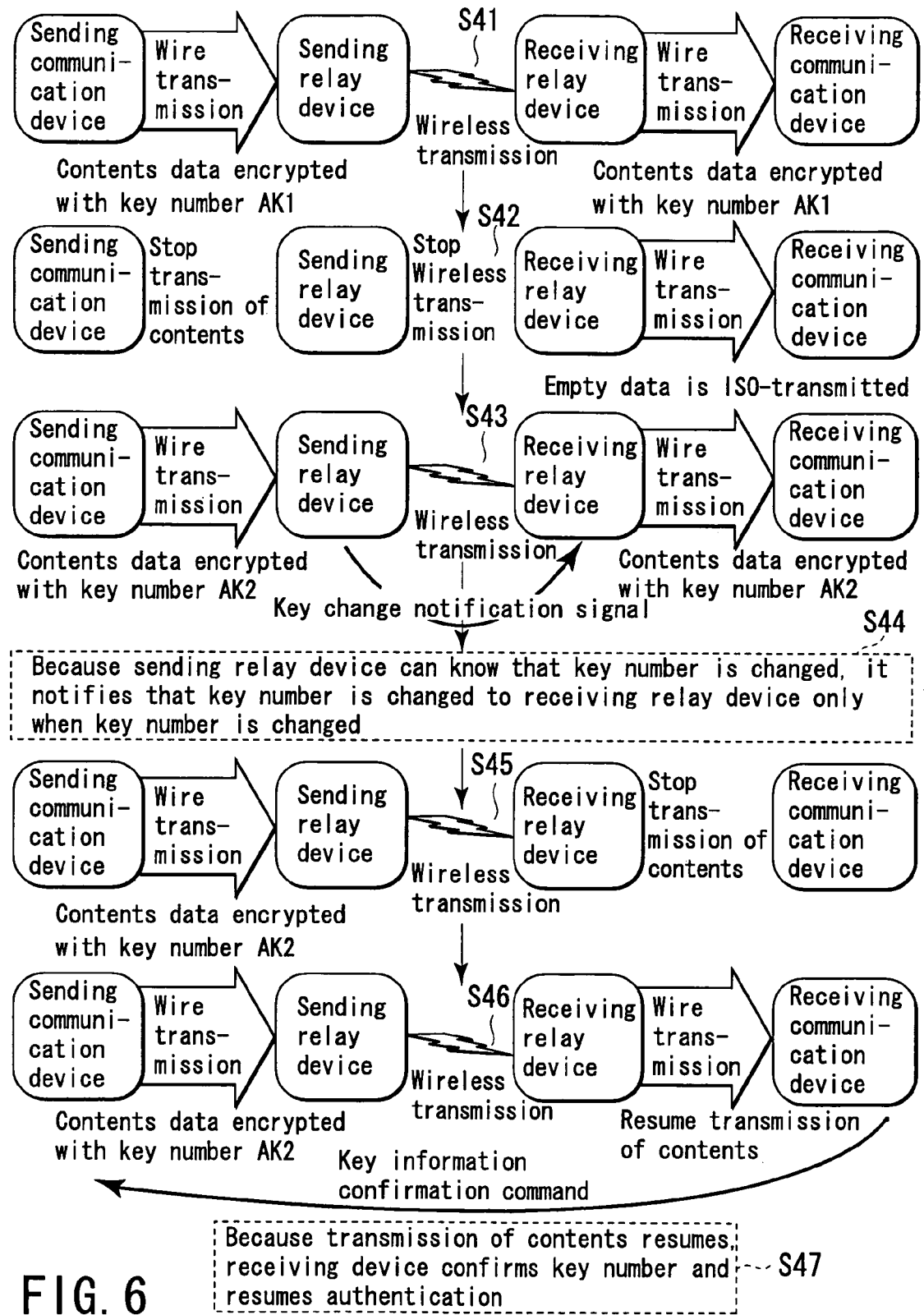
FIG. 6 is a flowchart for explaining a communication operation in the case of performing re-authentication by performing the key number change notification in the network relay device according to the present invention.

Referring to FIG. 6, at the time when communication is performed between the sending communication device 21 and the receiving communication device 22 by using the network relay devices 10 according to the present invention (S41), if sending of the contents information is suspended, sending from the sending relay device 10 is also suspended. The receiving relay device 10 confirms that a key change notification signal is not sent, and sends empty data to the receiving communication device 22 (S42). Thus, it is possible to prevent a decrease in a communication speed because of a waste key authentication processing being performed in the receiving communication device 22.

When a key number AK1 is changed to a key number AK2 and the communication resumes in the sending communication device 21 (S43), in the sending relay device 10, an inquiry signal serving as an AKE command is sent from the key number inquiry section 17 to the sending communication device 21. Then, the sending relay device 10 receives a key number signal outputted from the sending communication device 21. The key number change determination section 15 determines whether or not the key number has been changed. If the key number change notification section 16 is informed that it is determined that the key number has been changed, it generates a key change notification signal and sends the same via the second interface section 12 and the wireless network M to the receiving relay device 10 (S44).

The timing of sending the inquiry signal serving as the AKE command to the sending communication device 21 is the time when sending of the contents information is suspended and then resumed. Nevertheless, the present invention is not limited to such case and the time when sending of the contents information is suspended for a certain period of time may be possible. Further, other timings may be possible.

When the receiving relay device 10 receives the key change notification signal, it temporarily suspends sending of the empty data to the receiving communication device 22 (S45), and inspires the receiving communication device 22 to send an inquiry signal serving as an AKE command to the sending communication device 21 in order to obtain a new key number. When a sending signal such as the contents information (or the empty data) is suspended for a certain period of time, the receiving communication device 22 performs a processing for obtaining a new key number in accordance with a prescription in the current DTCP standard (S46). Accordingly, when the receiving relay device 10 temporarily suspends the sending, the receiving communication device 22 can obtain a new key number. Thus, the communication processing resumes by new key information provided by obtaining rapidly a new key number (S47).

In accordance with the network relay device of the present invention, while a decrease in speed is prevented without performing waste key number detection, a key number is reliably detected when a key must be changed. Thus, it is possible to perform a reliable and rapid communication processing.

<Second Key Change Notification Method>

Figure 7:
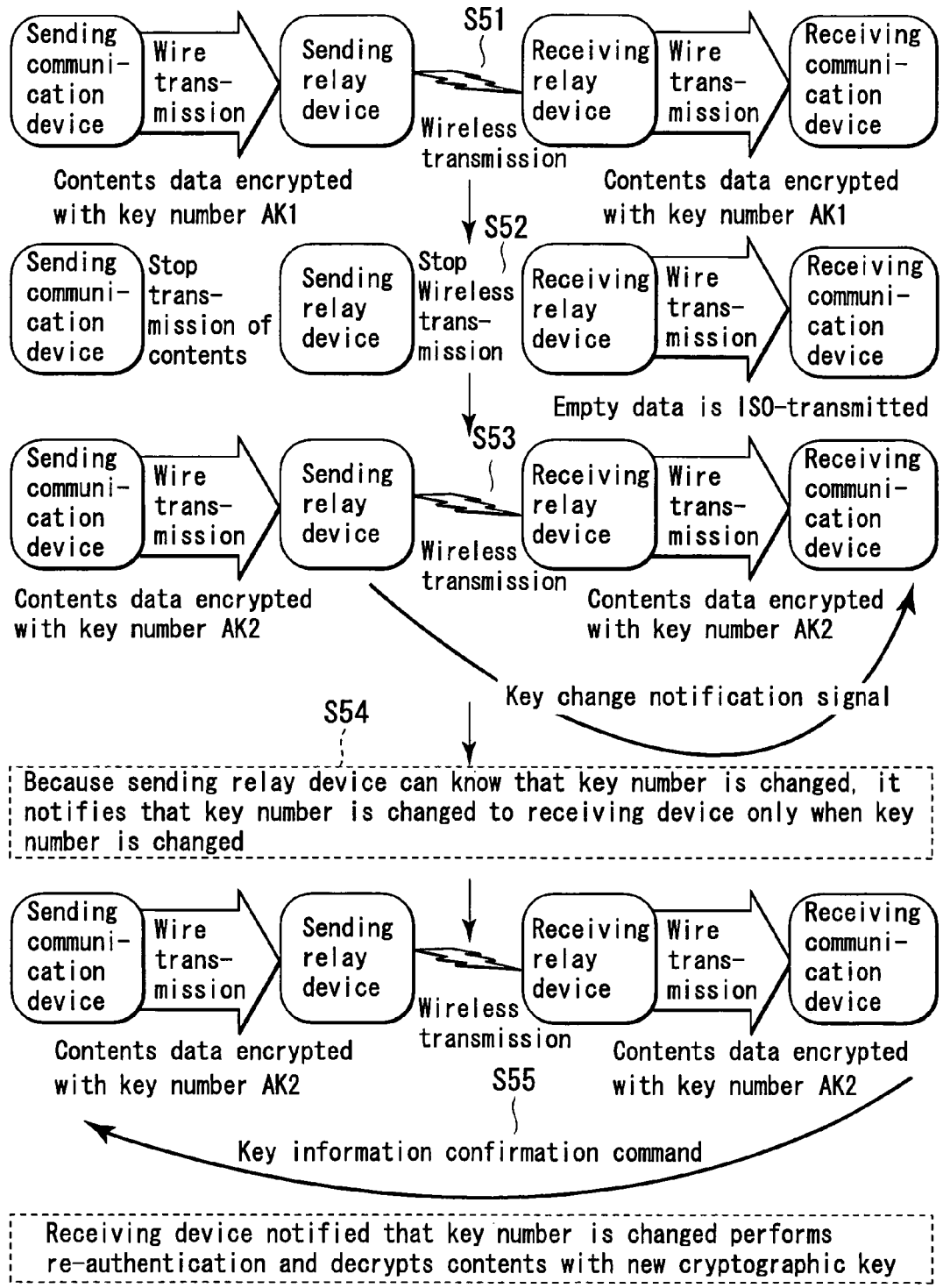
FIG. 7 is a flowchart for explaining a communication operation in the case of performing the re-authentication by performing the key number change notification in the network relay device according to the present invention.

In accordance with the first key change notification method, a decrease in speed is prevented by the processing of generating a key change notification signal and correspondingly suspending transfer of contents only between the network relay devices 10 according to the present invention. The present invention is not limited to this case, and a key change notification signal generated in the sending relay device 10 may be directly transferred to the receiving communication device 22 and the receiving communication device 22 may be inspired to obtain a new key number. In accordance with such method, a function of recognizing a key change notification signal and a processing for obtaining a new key number are set in the receiving communication device 22. Thus, transfer of the contents information needs not to be suspended in the receiving relay device 10, which enables a higher transfer speed. FIG. 7 is a flowchart for explaining a communication operation when re-authentication is performed by the network relay device according to the present invention notifying a key number change.

In accordance with the processing using the second key change notification method according to the present invention, referring to the flowchart shown in FIG. 7, at the time when communication is performed between the sending communication device 21 and the receiving communication device 22 by using the network relay devices 10 according to the present invention (S51), if sending of the contents information is suspended, sending from the sending relay device 10 is suspended. The receiving relay device 10 confirms that a key change notification signal is not sent, and sends empty data to the receiving communication device 22 (S52). Thus, it is possible to prevent a decrease in a communication speed because of a waste key authentication processing in the receiving communication device 22.

When a key number AK1 is changed to a key number AK2 and the communication resumes in the sending communication device 21 (S53), in the sending relay device 10, an inquiry signal serving as an AKE command is sent from the key number inquiry section 17 to the sending communication device 21. The sending relay device 10 receives a key number signal outputted from the sending communication device 21. The key number change determination section 15 determines whether or not the key number has been changed. If the key number change notification section 16 is informed that it is determined that the key number has been changed, it generates a key change notification signal and sends the same via the second interface section 12, the wireless network M and the receiving relay device 10 to be relayed to the receiving communication device 22 (S54).

As in the first key change notification method, the timing of sending the inquiry signal serving as the AKE command to the sending communication device 21 is the time when sending of the contents information is suspended and then resumed. Nevertheless, the present invention is not limited to such case and the time when sending of the contents information is suspended for a certain period of time may be possible. Further, other timings may be possible.

The receiving communication device 22 receives the key change notification signal, and sends the inquiry signal serving as the AKE command to the sending communication device 21 by the communication section 23 and the control section 24 shown in FIG. 1 in order to obtain a new key number (S55). The receiving communication device 22 obtains key information sent from the sending communication device 21 and decrypts the received contents information by the new key information.

Accordingly, in accordance with the second key change notification method according to the present invention, even if sending of the contents information is suspended because of noises or even if sending is suspended because a key number is changed, the sending processing between the sending communication device 21 and the receiving communication device 22 is not suspended. Thus, as compared to conventional devices, a reliable and high-speed communication processing can be performed.

Figure 8:
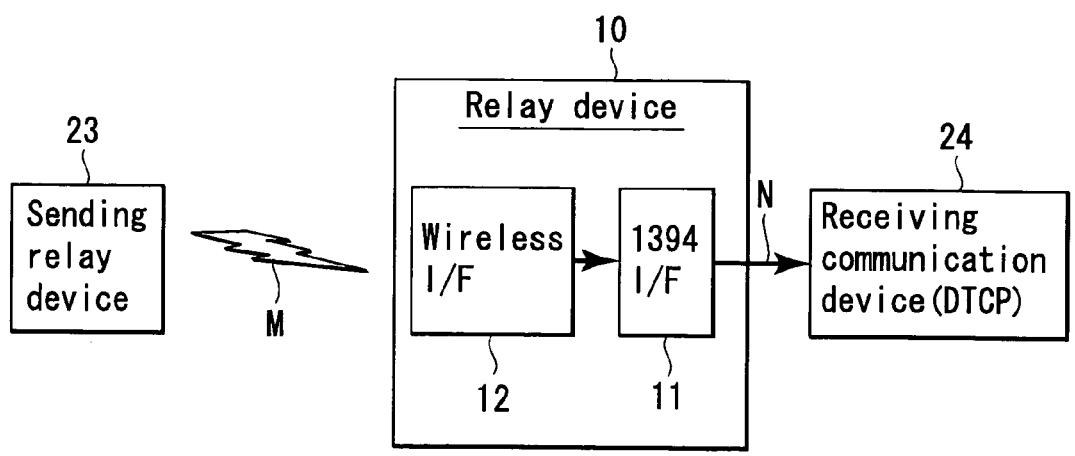
FIG. 8 is a system diagram illustrating another network system using the network relay device according to the present invention.

Further, as described above, the present invention, may be applied to, as well as the case of relaying two networks with a wireless network, the case that as shown in FIG. 8, sending/receiving is performed between the sending relay device 23 and the receiving communication device 24 via a wireless network M and a network N.

The above-described embodiments have been described with the communication standard being IEEE1394 or USB and the encryption method being DTCP. Nevertheless, the communication standard and the encryption method are not limited to such standard and method.

A person skilled in the art may realize the present invention by the above-described various embodiments. Further, the person skilled in the art could easily envision various modified examples for such embodiments, and apply the examples to various embodiments without an inventive ability. Accordingly, the present invention extends over a wide range so as not to conflict with the disclosed principle and new characteristics, and is not limited to the above described embodiments.

As described above in detail, by quickly informing that a key number for contents has been changed of a receiving network relay device, key detection can be rapidly performed. Further, even if sending is suspended because of noises, empty data is sent when a key is not changed, so that waste authentication and key detection cannot be performed. Thus, it is possible to provide a network relay device which can improve a processing speed as compared to conventional devices.

What is claimed is:

1. A network relay device which performs communication in order to relay from a first network to a second network comprising:
   a first interface which is connected to a first network and receives contents information encrypted by key information;
   a second interface which is connected to a second network which is different from the first network and sends the contents information; and
   a notification section which detects whether or not the key information changed via the first interface, and which, if the key information is changed, notifies a key change notification signal to the second network via the second interface;
   wherein the first interface and the second interface send/receive the contents information encrypted with the key information in accordance with DTCP (Digital Transmission Content Protection) standard.

2. A network relay device which performs communication in order to relay from a first network to a second network comprising:
   a first interface which is connected to a first network and receives contents information encrypted by key information;
   a second interface which is connected to a second network which is different from the first network and sends the contents information; and
   a notification section which detects whether or not the key information changed via the first interface, and which, if the key information is changed, notifies a key change notification signal to the second network via the second interface;
   wherein the notification section obtains the key information by using a command for inquiring the key information based on the DTCP standard, and determines whether or not the key information is changed by comparing the obtained key information with the prior key information.

3. A communication device comprising:

a communication section which performs a communication processing for contents information encrypted by key information with a communication device on a network via an interface connected to the network and other network relay device connected to the other network; and a control section which, when the communication section receives a key change notification signal from the network relay device via the interface, sends a signal to obtain new key information to the communication device on the other network, decrypts the contents information on a basis of the new key information, and outputs the decrypted information.

4. A network relay method
performed by a network relay device having a first interface which is connected to a first network and receives contents information encrypted with key information and a second interface which is connected to a second network which is different from the first network and sends the contents information to a network relay device to be relayed, the method comprising the steps of:

inquiring whether or not the key information is changed via the first interface; and receiving an answer signal to the inquiry, and if the key information is changed, notifying a key change notification signal to the second network via the second interface wherein the first interface receives and the second interface sends the contents information encrypted with the key information based on DTCP standard.

* * * * *